United States Patent
Nicolini et al.

(10) Patent No.: US 9,023,924 B2
(45) Date of Patent: May 5, 2015

(54) PROCESS FOR THE PREPARATION OF A 1,3-BUTADIENE AND STYRENE COPOLYMER CONTAINING A RANDOM SECTION IN ITS MAIN CHAIN FOLLOWED BY A BLOCK WITH A STRUCTURE DIFFERENTIATED FROM THE MAIN CHAIN, HOMOPOLYMERIC OR COPOLYMERIC, FUNCTIONALIZED AND THE PRODUCT OBTAINED FROM THIS

(71) Applicant: LANXESS Elastomeros do Brasil S.A., Duque de Caxias (BR)

(72) Inventors: Luiz Fernando Nicolini, Rio de Janeiro (BR); Clovis Henriques de Lira, Niteroi (BR); Carlos Roberto de Albuquerque Campos, Jaboatao dos Guararapes (BR); Fernando Vasconcelos Figueiredo, Recife (BR); Mauro Cresta de Barros Dolinsky, Niteroi (BR); Neusa Maria Toccheto Pires, Ilha do Governador (BR); Monica de Almeida de Sant'Anna, Petropolis (BR)

(73) Assignee: Lanxess Elastomeros do Brasil S.A., Rio de Janeiro (BR)

( * ) Notice: Subject to any disclaimer, the term of this patent is extended or adjusted under 35 U.S.C. 154(b) by 0 days.

(21) Appl. No.: 13/868,461

(22) Filed: Apr. 23, 2013

(65) Prior Publication Data

US 2013/0237666 A1 Sep. 12, 2013

Related U.S. Application Data

(63) Continuation of application No. 12/745,940, filed as application No. PCT/IB2008/003442 on Dec. 11, 2008, now abandoned.

(30) Foreign Application Priority Data

Dec. 14, 2007 (BR) .................................... 10704674

(51) Int. Cl.
C08K 5/00 (2006.01)
C08F 8/00 (2006.01)
C08F 236/06 (2006.01)
C08C 19/44 (2006.01)
C08G 77/442 (2006.01)

(52) U.S. Cl.
CPC ............... *C08F 236/06* (2013.01); *C08C 19/44* (2013.01); *C08G 77/442* (2013.01)

(58) Field of Classification Search
USPC ......................................... 524/139
See application file for complete search history.

(56) References Cited

U.S. PATENT DOCUMENTS

| | | | |
|---|---|---|---|
| 5,206,301 A | 4/1993 | Hattori et al. | |
| 5,929,149 A | 7/1999 | Matsuo et al. | |
| 6,013,708 A | 1/2000 | Mallon | |
| 6,013,718 A * | 1/2000 | Cabioch et al. | 524/506 |
| 6,667,362 B2 | 12/2003 | Robert et al. | |
| 6,846,478 B1 | 1/2005 | Doyle et al. | |
| 2005/0101743 A1 * | 5/2005 | Stacy et al. | 525/314 |

FOREIGN PATENT DOCUMENTS

GB 2368069 A 4/2002

OTHER PUBLICATIONS

Schuster, R. H., "Selective Interactions in Elastomers, a Base for Compatibility and Polymer-Filler Interactions", Rubber Chemistry and Technology, 1996, vol. 69, pp. 769-780.
International Search Report from co-pending Appliction PCT/IB208/003442, dated May 7, 2009.

* cited by examiner

*Primary Examiner* — Hui Chin

(57) ABSTRACT

This invention refers to a process for the preparation of a 1,3-butadiene and styrene copolymer, containing a random section in its main chain, followed by a block with a structure differentiated from the main chain, homopolymeric or copolymeric, functionalized, and the product obtained from this.

31 Claims, No Drawings

PROCESS FOR THE PREPARATION OF A 1,3-BUTADIENE AND STYRENE COPOLYMER CONTAINING A RANDOM SECTION IN ITS MAIN CHAIN FOLLOWED BY A BLOCK WITH A STRUCTURE DIFFERENTIATED FROM THE MAIN CHAIN, HOMOPOLYMERIC OR COPOLYMERIC, FUNCTIONALIZED AND THE PRODUCT OBTAINED FROM THIS

This application is a continuation of U.S. patent application Ser. No. 12/745,940, which is the National Stage of International Application No. PCT/IB08/003442, filed Dec. 11, 2008, which is entitled to the right of priority of Brazil Patent Application No. PI0704674-0 filed Dec. 14, 2007, the contents of which are hereby incorporated by reference in their entirety.

This invention refers to a process for the preparation of a 1,3-butadiene and styrene copolymer, containing a random section in its main chain, followed by a block with a structure differentiated from the main chain, homopolymeric or copolymeric, functionalized, and the product obtained from this.

BACKGROUND OF THE INVENTION

Obtaining materials that are perfectly adaptable in their usage has been a constant challenge for science and technology in recent years. The growing demand for materials that have an appropriate balance of important and specific properties, added to the ecological restrictions of utilization, has produced great efforts from scientists in the search for innovative solutions to these challenges.

The science of polymers has made a decisive contribution to this process. Due to intensive research and the use of sophisticated processes of polymerization, new products have been obtained, with a combination of properties that until now were not found in traditionally known materials. The emphasis with respect to the environment has guided this research and generated processes and products that are increasingly ecologically appropriate.

Among the wide variety of polymers, the elastomers are the best known. Due to their large capacity to deform elastically when submitted to tension and then return spontaneously to their original form when the tension ceases, elastomers can be employed to obtain many important products when correctly used in the form of vulcanized compounds. Among these products are mainly tires, in all their complexity, including their constituents such as the tread, sidewalls etc, as well as mats, straps and a wide range of technical products.

These rubber or elastomeric products, in determinate applications, need to present a series of properties, which cannot always be combined simultaneously. In the case of tires for automobiles, the following properties are required: elasticity, low abrasion wear, good adhesion on different surfaces, and wet skid resistance, in low and high temperatures. Performance improvement in one of these properties normally results in a decrease in the performance in one of the others. This is equally undesirable and most of the time it becomes impossible to optimize all the properties.

A number of solutions have been used by tire manufacturers, with the objective of combining and improving the different properties of their products. This has essentially consisted in the combined use of different elastomers in the utilization of different reinforcement loads, which interact physically and chemically with the elastomers, and in the use of compatible additives in the preparation of the vulcanized rubber compounds.

For example, tires manufactured with elastomers of the type SBR (copolymers 1,3-butadiene-styrene), including those produced in a cold emulsion (E-SBR) and those produced in a solution (S-SBR), with a chemical content of combined styrene of approximately 23%, present a high wet skid resistance, and also a high rolling resistance. The tires that are manufactured with conventional elastomers such as the 1,4-Cis BR (polybutadiene High Cis), NR (Natural Rubber) and IR (Polyisoprene), present low rolling resistance and low wet skid resistance (P. L. A. Coutinho, C. H. Lira, L. F. Nicolini, A Ferreira; Elastomers for the "Green Tire", $1^{st}$ Chemical and Petrochemical Industry Congress of Mercosur, Buenos Aires, Argentina, 1998). The appropriate combination of these different elastomers, in vulcanized compounds, allows the production of tires with an improved balance of properties.

Moreover, the use of compatible additives, utilized in the preparation of vulcanized compounds, or even the employment of modified elastomers in the polymeric structure, including the incorporation of specific functional groups, increases the miscibility between the different elastomers, as well as their interaction with the reinforcement loads, which markedly improves the resulting properties of the tire.

As has been described in other researches, an increase in the chemical content of the 1,2-vinylic units, in the polydienic sections of the elastomers of type S-SBR, results in an increase of its glass transition temperature Tg), which provides an improvement in the skid resistance properties of the vulcanized compounds for tires. (C. H. Lira, L. F. Nicolini, G. Weinberg, N. M. T. Pires, Coutinho—Elastomers For High Performance Tires—Presented at a Meeting of the Rubber Division, American Chemical Society, Cleveland, Paper No 112, 2001).

Moreover, it was demonstrated that a higher chemical content of these units assists the solubility of the elastomers of type S-SBR in other elastomers, such as 1,4 Cis-BR and NR (R. H. Schuster, H. M. Issel and V. Peterseim—Selective Interactions in Elastomers; A Base for Compatibility and Polymer-Filler Interactions; Rubber Chem. Technol., 69, 5, 1996).

Therefore, any structural modification that can be incorporated into the different elastomers that assists the miscibility between them, besides providing an improved compatibility with the different reinforcement fillers employed in the vulcanized elastomeric compounds, also improves the resulting properties of the tires.

There is a special interest in the tread, the part of the tire where the main mechanical forces are concentrated and where the properties with respect to safety, such as wet/icy skid resistance, are demanded.

The elastomeric compounds used in the production of tires, especially in the tread, are normally composed of copolymers, formed by a conjugated diene and a monomer with an aromatic vinyl structure.

Elastomers of type S-SBR are mainly used. These copolymers present a predominantly random distribution of their constituent mers along their polymeric chains and can also present sections with blocked distribution, or a mixture of random and blocked distribution. They are decisive in the obtainment of the final properties of the tire. The following material deals with the current state of the art and is incorporated in its entirety as a reference.

As has been previously stated, the state of the art with respect to tires, especially the tread, requires a level of development that allows the employment of new materials, or rather polymers, which provide tires (and the tread) with a high performance, in view of given vehicle and tire performance conditions.

In the documentation of patent EP 0929582 (U.S. Pat. No. 6,013,718) and EP 1110998 (U.S. Pat. No. 6,667,362 B2), there is a description of the preparation and use of polydienes and copolymers resulting in the copolymerization between the conjugated dienes and a monomer with an aromatic vinyl structure (e.g.: S-SBR), which contains functional groups of siloxane and silanol in the end section of the polymeric chains. These groups interact with the silica used in the vulcanized compounds, improving its properties. The patents display the comparative results obtained from the employment of these elastomers in several vulcanized elastomeric compounds.

The patent GB 2368069 describes the process of the preparation of the functionalized polymers in both the extremities of the polymeric chains. Its structure is essentially that of a triblock, where the intermediary section can be a polydiene or a copolymer, resulting from the copolymerization between the conjugated diene and a monomer with an aromatic vinyl structure (e.g.: S-SBR), where the end sections are preferentially polydialkylsiloxanes.

The patent EP 0849 333 B2 describes the use of siloxanes substituted in the preparation of the polydienes or copolymers, resulting from the copolymerization between the conjugated dienes and a monomer with an aromatic vinyl structure. The use of these functionalized polymers in vulcanized elastomeric compounds and their observed properties are also presented.

In view of the abovementioned state of the art developments, this invention provides a product and a process of preparation of a new family of elastomers of type S-SBR, designed principally for the production of high performance tires. The production of these elastomers uses advanced processes of polymerization, allowing larger control over the macrostructure and microstructure of the polymer.

The elastomeric product thus produced allows for the production of tires with highly desirable performance specifications, particularly with respect to the tread.

OBJECTIVE OF THE INVENTION

The objective of this invention is the preparation of elastomers of type S-SBR (copolymers of 1,3-butadiene-styrene), modified in their polymeric structure and functionalized at the extremity, and the preparation process.

More specifically, this invention deals with the preparation of copolymers of type S-SBR, with a controlled macrostructure and microstructure, the introduction of blocks with one or more monomers at the end of the polymeric chains, followed by a terminal functionalization, and the employment of these copolymers in vulcanized elastomeric compounds and their properties.

DESCRIPTION OF THE INVENTION

This invention refers to a process for the preparation of a 1,3-butadiene and styrene copolymer containing a random section in its main chain, followed by a block with a structure differentiated from the main chain, homopolymeric or copolymeric, functionalized, and a product that includes a 1,3-butadiene and styrene copolymer, with a random section in the main chain, followed by a block with a structure differentiated from the main chain, homopolymeric or copolymeric, functionalized. More particularly, this invention provides new polymeric materials of 1,3-butadiene and styrene. This allows for the manufacture of tires and tread with highly desirable characteristics and performance.

The total control over the polymeric architecture results in elastomers with an improved balance of mechanical properties and therefore greater suitability to their end use.

Although it is known that polydienes and/or copolymers, resulting from the copolymerization between conjugated dienes and a monomer with an aromatic vinyl structure, can be functionalized in their extremities, in the appropriate conditions, bringing benefits to their employment in vulcanized elastomeric compounds, the effect of a structural change in the polymeric chains of these polymers, which includes a small homopolymeric or copolymeric block, situated in one or both of the extremities of the polymeric chains, followed by terminal functional groups, in the properties of the vulcanized elastomeric compounds, is not known in the state of the art.

Also, the effect of these blocks, formed by homopolymers or copolymers, which have different glass transition temperatures (Tg) from the main chains of the elastomer, in the properties of the vulcanized elastomeric compounds, is not known.

It is not known that the wet/icy skid resistance properties of vulcanized elastomeric compounds can be improved by using in their preparation an elastomer, which includes a small homopolymeric or copolymeric block, situated in one or both of the extremities of the polymeric chains, followed by terminal functional groups.

The Product

The elastomers in this invention are copolymers of the functionalized type S-SBR, produced by the process of anionic polymerization in solution.

They are basically formed by a preferential composition between one or more conjugated dienes and one or more monomers with an aromatic vinyl structure, in appropriate proportions. They have a controlled macrostructure and microstructure, with an appropriate chemical content of 1,2-vinylic units, based on the conjugated diene incorporated in the copolymer, and the specific functional groups in the polymeric structure.

These elastomers have a predominantly random distribution of their constituent mers, along the main polymeric chains. At the end of these chains, in one or both of the extremities, is a small block, with a structure differentiated from the main chain, which can be homopolymeric or copolymeric. Beyond the small blocks at the end of the chains, these elastomers have a terminal functionalization, preferentially with functional groups that interact and/or react with the reinforcements utilized in the vulcanized elastomeric compounds.

Furthermore, the main chains are linear or branched, with a controlled microstructure, and present a determinate content of 1,2-vinylic units, based on the conjugated diene incorporated in the copolymer.

Elastomers with radial polymeric chains, or even a mixture of linear and radial chains, can also be obtained in the appropriate conditions. For this to happen, it is necessary to use coupling agents, such as tin tetrachloride ($SnCl_4$) and silicon tetrachloride ($SiCl_4$), with rigorous control over the efficiency of the coupling reactions.

More specifically, these elastomers are copolymers obtained by the polymerization of one or more monomers of the conjugated diene type (e.g.: 1,3-butadiene) with one or more monomers with an aromatic vinyl structure (e.g.: styrene), which present a predominantly random distribution of their constituent mers in the main chain, wherein microsequences of a same mer have preferentially less than 10 units, and has a preferentially linear or branched structure. They also present a controlled microstructure, with a chemical content of 1,2-vinylic units between 8% and 80%, based on the total of the conjugated diene incorporated in the copolymer, and can also present different content of 1,4-cis, and 1,4-trans units, as well as 3,4-vinyl, depending on the conjugated diene employed.

These elastomers present, at one extremity or both extremities of their polymeric chains, a small block with a structure differentiated from the main chain, homopolymeric (e.g.: polybutadiene or polystyrene) or copolymeric, (e.g.: the copolymerization of two or more conjugated dienes, or the copolymerization of two or more monomers with an aromatic vinyl structure, or the copolymerization of one or more conjugated dienes with one or more monomers with an aromatic vinyl structure, including the possible different microstructures for the employed diene(s), provided that the final structure of this block is different from the main chain, followed by a terminal functionalization with specific functional groups, which interact and/or react with the reinforcements of the vulcanized compounds.

The small polymeric blocks with the differentiated structure, situated at the end of the polymeric chains, can have different lengths, preferentially between 5 and 250 mers and more preferentially between 20 and 180 mers. The 1,4-cis, 1,4-trans, 1,2-vinyl and even the 3,4-vinyl units can also be present in the structure, depending on the conjugated diene employed.

The terminal functional groups of the polymeric chains of these elastomers are preferentially of the type —OH, —COOH, —COX, where X is a halogen, —SH, —CSSH, —NCO, amine, epoxy, silyl, silanol or siloxane, as well as the polysiloxane groups, and siloxanes or polysiloxanes containing amine groups.

Preferentially, these groups can be better represented by the following structures:

Amine groups: —N($R_1$)$_2$, —NR1R2, —NHR$_1$, —NH$_2$, where $R_1$ and R2 are identical or different, can be alkyl, linear or branched, cycloalkyl, aryl, alkylaryl, aralkyl or vinyl groups, in each case having 1 to 20 carbon atoms;

Silyl, silanol and siloxane groups; —SiH$_2$(OH), —Si($R_1$)$_2$(OH), —SiH(OH)$_2$, —SiR$_1$(OH)$_2$, —Si(OH)$_3$, —Si(OR$_1$)$_3$, (SiR$_1$R$_2$O)$_x$—R$_3$, —Si(R$_3$)$_{3-m}$(X)$_m$, where X is a halogen, x is the number of repetitive units between 1 and 500, m is the number of linked groups, varying from 0 to 3, $R_1$ and $R_2$ are identical or different, and can be alkoxy or alkyl, linear or branched, cycloalkyl, aryl, alkylaryl, aralkyl or vinyl groups, in each case having 1 to 20 carbon atoms, and $R_3$ is H or alkyl, linear or branched, in each case having 1 to 20 carbon atoms, or a mononuclear aryl group;

Siloxane groups that contained amine groups, are represented by the formula -A$^1$-Si(A$^2$-N(H)$_k$(R$_1$)$_{2-k}$))$_y$(OR$_1$)$_z$(R$_3$)$_{3-(y+z)}$, where: k can vary from 0 to 2, y can vary from 1 to 3, and z can vary from 0 to 2, $0 \leq y+z \leq 3$, being that $R_1$ and $R_2$ are identical or different, and can be alkyl, linear or branched, cycloalkyl, aryl, alkylaryl, aralkyl or vinyl groups, in each case having 1 to 20 carbon atoms, mononuclear aryl groups, $R_3$ is H or alkyl, linear or branched, in each case having 1 to 20 carbon atoms, or a mononuclear aryl group, and A$^1$ and A$^2$ are chains of up to 12 carbon atoms, linear or branched, preferentially alkyl, alyl or vinyl.

For the elastomers of this invention, siloxanes are preferentially used, as terminal functional groups of their polymeric chains, in the form of structures that can be represented by the general formula —[—Si($R_1R_2$)—O—]$_n$—Si($R_1R_2$)—OH, where $R_1$ and $R_2$ are identical or different, and can be alkoxy or alkyl, linear or branched, cycloalkyl, aryl, alkylaryl, aralkyl or vinyl groups, in each case having 1 to 20 carbon atoms, and n represents the number of units of the siloxane functional group before a silanol terminal group, varying from 1 to 500.

Polysiloxane sequences or blocks can also be incorporated and distributed along the polymeric chains although they are preferentially terminal.

Small sequences or microsequences of one of the monomers of the copolymer, situated along the polymeric chains, can also form part of the structure of these elastomers.

More specifically, the elastomers of this invention present a percentage composition in weight of their main chain, which can vary from 5% to 50%, for the aromatic vinyl monomer (e.g.: styrene), and from 50% to 95% for the conjugated diene (e.g.: 1,3-butadiene).

Preferentially, these elastomers present a composition from 15% to 40% for the % w/w of the monomer with an aromatic vinyl structure, and from 70% 60% to 85% for the % w/w of the conjugated diene incorporated in the copolymer.

They have a controlled microstructure, with a chemical content of 1,2-vinylic units from 8% to 80%, in the main chain, based on the conjugated diene incorporated in the copolymer.

More preferentially, the chemical content of the 1,2-vinylic units found in the range from 10% to 70%, can also present different chemical contents in its microstructure of 1,4-cis, and 1,4-trans units, as well as 3,4-vinyl units, depending on the conjugated diene employed in the copolymerization.

These elastomers present at the end of their polymeric chains, at one or both of the extremities, a small block with a structure differentiated from the main chain, homopolymeric (e.g.: polybutadiene or polystyrene) or copolymeric, e.g.: copolymerization of two or more conjugated dienes, or copolymerization of two or more monomers with an aromatic vinyl structure, or copolymerization of one or more conjugated dienes with one or more monomers with an aromatic vinyl structure, including the possible different microstructures for the diene(s) employed provided the end structure of this block is different from the main chain. Preferentially, these small blocks at the end of the polymeric chains consist of polybutadiene or polystyrene, followed by a terminal functionalization with the siloxane and silanol functional groups.

To obtain this functionalization in the extremities of the polymeric chains, the following are used preferentially; hexamethylcyclotrisiloxane (D$_3$), which allows the incorporation of continuous sequences of the siloxane functional group —[—Si(CH$_3$)$_2$—O—]—, with different lengths, and a silanol terminal group —Si(CH$_3$)$_2$—OH.

These elastomers have a Mooney Viscosity (M11+4 @ 100° C.) in a range from 30 to 90, and an average molecular weight in the range from Mw=80,000 to 700,000, with a polydispersion in the range from 1.05 to 4.0, when analyzed by Size Exclusion Chromatography (SEC), based on polystyrene standards.

These elastomers present glass transition temperatures, Tg, in the range from −92° C. to −1° C., depending on the chemical content of the aromatic vinyl monomer of the copolymer and the microstructure of the conjugated diene incorporated in the copolymer.

They present, in one or both extremities of their polymeric chains, a small block with a polymeric structure differentiated from the main chain. This block can be homopolymeric (e.g.: polybutadiene or polystyrene) or copolymeric, (e.g.: copolymerization of two or more conjugated dienes, or copolymerization of two or more monomers with an aromatic vinyl structure, or copolymerization of one or more conjugated dienes with one or more monomers with an aromatic vinyl structure, including the different microstructures possible for the diene(s) employed, provided that the final structure of this block is different from the main chain. These small blocks contain from 5 to 250 incorporated mers per chain. It is preferable that these blocks contain from 10 to 200 incorporated mers and, even more preferable that they contain from 20 to 180 incorporated mers per chain.

The elastomers of this invention also have a terminal functionalization, which is based on the preferential incorporation of a sequence of siloxane groups —[—Si(CH$_3$)$_2$—O—]—, which vary in the range from 1 to 500 units per polymeric chain, followed by the silanol termination (—Si(CH$_3$)$_2$—OH).

A schematic representation of the structures of these elastomers is presented below.

where, A represent the main chains of a polymer, formed by the copolymerization between one or more conjugated dienes with one or more monomers with an aromatic vinyl structure (e.g.: S-SBR), which have a preferentially random distribution of their constituent mers, linear or branched structure, and a controlled chemical content of 1,2-vinylic units, based on the incorporated conjugated diene;

B represents a block with a structure differentiated from the main chain, homopolymeric (e.g.: polybutadiene or polystyrene) or copolymeric, (e.g.: copolymerization of two or more conjugated dienes, or copolymerization of two or more monomers with an aromatic vinyl structure, or copolymerization of one or more conjugated dienes with one or more monomers with an aromatic vinyl structure, including the different possible microstructures for the diene(s) employed, provided that the final structure of this block is different from the main chain;

F is terminal functional groups of the polymeric chains of these elastomers preferentially of the type —OH, —COOH, —COX, where X is a halogen, —SH, —CSSH, —NCO, amine, epoxy, silyl, silanol or siloxane, as well as the polysiloxane groups, and siloxanes or polysiloxanes containing amine groups; and preferentially:

Amine groups: —N(R$_1$)$_2$, —NR1R2-NHR$_1$, —NH$_2$, where R$_1$ and R2 are identical or different, can be alkyl, linear or branched, cycloalkyl, aryl, alkylaryl, aralkyl or vinyl groups, in each case having 1 to 20 carbon atoms;

Silyl, silanol and siloxane groups: —SiH$_2$(OH), —Si(R$_1$)$_2$(OH), —SiH(OH)$_2$, —SiR$_1$(OH)$_2$, —Si(OH)$_3$, —Si(OR)$_3$, R$_2$O)$_x$—R$_3$, —Si(R$_3$)$_{3-m}$(X)$_m$, where X is a halogen, x is the number of repetitive units between 1 and 500, m is the number of linked groups, varying from 0 to 3, R$_1$ and R2 are identical or different, and can be alkoxy or alkyl, linear or branched, cycloalkyl, aryl, alkylaryl, aralkyl or vinyl groups, in each case having 1 to 20 carbon atoms, and R$_3$ is H or alkyl, linear or branched, in each case having 1 to 20 carbon atoms, or a mononuclear aryl group;

Siloxane groups that contained amine groups, are represented by the formula -A$^1$-Si(A$^2$-N((H)$_k$(R$_1$)$_{2-k}$))$_y$(OR$_1$)$_z$(R$_3$)$_{3-(y+z)}$, where: k can vary from 0 to 2, y can vary from 1 to 3, z can vary from 0 to 2, 0≤y+z≤3, being that R$_1$ and R$_2$ are identical or different, and can be alkyl, linear or branched, cycloalkyl, aryl, alkylaryl, aralkyl or vinyl groups, in each case having 1 to 20 carbon atoms, mononuclear aryl groups, R$_3$ is H or alkyl, linear or branched, in each case having 1 to 20 carbon atoms, or a mononuclear aryl group, and A$^1$ and A$^2$ are chains of up to 12 carbon atoms, linear or branched, preferentially alkyl, alyl or vinyl.

Examples of these elastomers, with their main characteristics, are presented in Table 1 (group 1 of elastomers) and in Table 2 (group 2 of elastomers), as follows, including the applicable ranges for each item:

TABLE 1

| Group 1 of elastomers | | | |
|---|---|---|---|
|  | S-SBR B1 | S-SBR B2 | Applicable Range |
| Styrene/Butadiene ratio (main chain) by weight, % | 19.0/81.0 | 19.6/80.4 | 5/95 to 50/150 |
| Content of the 1,2-Vinylic Units, %[a] | 64.1 | 63.7 | 8 to 80 |
| Mooney Viscosity (Ml 1 + 4 @ 100° C.) | 60.9 | 58.3 | 30 to 90 |
| Molecular Weight and Polydispersion (SEC, PS standards) | Mw = 412,000 Pd = 1.2 | Mw = 432,000 Pd = 1.3 | 80,000 to 700,000 Pd = 1.05-4.0 |
| Glass Transition Temperature, Tg, DSC, ° C. | −25.4 | −25.5 | −92 to −1 |
| Structure of the main elastomer chain RMN$^1$H | Statistical Copolymer 1,3-butadiene-styrene; linear chains | Statistical Copolymer 1,3-butadiene-styrene; linear chains | Micro-sequences of a same mer which has less than 10 unities units |
| Block with mers of butadiene at the end of the main chain | Block with an average of 50 mers of butadiene per chain, followed by functionalization | Block with an average of 150 mers of butadiene per chain, followed by functionalization | 5 to 250 |

TABLE 1-continued

Group 1 of elastomers

|  | S-SBR B1 | S-SBR B2 | Applicable Range |
|---|---|---|---|
| Functionalization —[—Si(CH$_3$)$_2$—O—]$_n$—Si(CH$_3$)$_2$—OH | Terminal with an average of 8.0 groups per chain including the silanol group | Terminal with an average of 5.0 groups per chain including the silanol group | 1 to 500 |

DSC = Differential Scanning Calorimetry.
SEC = Size Exclusion Chromatography
PS = polystyrene
$^{(a)}$= based on the content of the diene incorporated in the copolymer

TABLE 2

Group 2 of elastomers

|  | S-SBR C1 | S-SBR C2 | Applicable Range |
|---|---|---|---|
| Styrene/Butadiene ratio (main chain) by weight, % | 21.4/78.6 | 23.3/76.7 | 5/95 to 50/150 |
| Content of the 1,2-Vinylic Units, %$^{(a)}$ | 62.8 | 61.0 | 8 to 80 |
| Mooney Viscosity (Ml 1 + 4 @ 100° C.) | 56.4 | 54.9 | 30 to 90 |
| Molecular Weight and Polydispersion (SEC, PS standards) | Mw = 352,000 Pd = 1.34 | Mw = 358,000 Pd = 1.4 | 80,000 to 700,000 Pd = 1.05-4.0 |
| Glass Transition Temperature, Tg, DSC, ° C. | −24.7 | −19.3 | −92 to 1 |
| Structure of the main chain RMN$^1$H | Statistical Copolymer 1,3-butadiene-styrene; linear chains | Statistical Copolymer 1,3-butadiene-styrene; linear chains | Micro-sequences of a same mer which has less than 10 unities |
| Block with mers of styrene at the end of the main chain | Block with an average of 54 mers of styrene per chain, followed by functionalization | Block with an average of 130 mers of styrene per chain, followed by functionalization | 5 to 250 |
| Functionalization —[—Si(CH$_3$)$_2$—O—]$_n$—Si(CH$_3$)$_2$—OH | Terminal with an average of 3.0 groups per chain including the silanol group | Terminal with an average of 3.0 groups per chain including the silanol group | 1 to 500 |

DSC = Differential Scanning Calorimetry.
SEC = Size Exclusion Chromatography
PS = polystyrene
$^{(a)}$= based on the content of the diene incorporated in the copolymer The Production Process For the production of these elastomers, it is necessary to employ a polymerization process that allows a refined control over the polymeric structure of the final product.

The anionic polymerization and its characteristic of "live polymerization", allows the obtainment of polymers with a controlled architecture. Due to their large versatility, varied polymeric structures can be obtained, allowing a large control over the microstructure and the macrostructure of the polymer, including the incorporation of functional groups in the polymeric chains.

The process requires a rigorous inspection of the employed materials to remove any impurities that could act as terminators and/or prejudice the control of the polymerization.

The elastomers cited in this invention are obtained by this process of polymerization, with the employment of different rectional conditions and additives that aim to incorporate determinate characteristics in the final product.

The process of polymerization of these elastomers can be conducted in a continuous manner or in batches. However, the batch process is normally preferred because it provides a better control over the variables that affect the molecular architecture of the polymer.

The reactions of the polymerization, strictly speaking, are realized employing solvents, preferentially apolar, such as cyclohexane or n-hexane, although other solvents of the aliphatic class can also be utilized. Solvents of the aromatic class, such as toluene, can also be employed. However, their use is to be avoided because it negatively affects the kinetics of the reactions, is more difficult to remove, and for environmental restrictions.

The initiator normally employed in these polymerizations is n-butyl-lithium although, in general, compounds of the group of alkyl-lithiums can also be employed. Examples of the alkyl groups of these initiators are: methyl, ethyl, n-propyl, isopropyl, n-butyl, sec-butyl, t-butyl, n-amyl, sec-amyl, n-hexyl, sec-hexyl, n-heptyl, n-octyl, n-nonyl, n-dodecyl and octadecyl.

More specifically, the initiators are: n-butyl-lithium, sec-butyl-lithium, n-propyl-lithium, isobutyl-lithium, t-butyl-lithium and amyl-lithium.

Alkyl-dilithium or even alkyl-multi-lithium initiators, as described in the patents WO 02/02063 and GB 2368069, can also be utilized for the obtainment of these elastomers.

The monomers 1,3-butadiene and styrene are mainly used for the production of these elastomers, although other conjugated dienes and other vinyl-aromatic monomers can also be employed.

Of the conjugated dienes, aside from 1,3-butadiene, there are: 2-alkyl-1,3-butadiene, 2,3-dialkyl-1,3-butadiene, 2-alkyl-3-alkyl-1,3-butadiene, 1,3-pentadiene, 1,3-hexadiene, 2,4-hexadiene, etc. As well as styrene, other vinyl-aromatic monomers can also be employed, such as alpha-methyl-styrene, orto, meta and para divinylbenzene, orto, meta and para-methylstyrene, para-t-butyl-styrene, vinyl-toluene, methoxystyrene, vinylmesitylene, etc.

For the control of the chemical content of the 1,2-vinylic units of the diene incorporated in the copolymer, polar substances are utilized that act as Lewis bases, such as N,N,N,', N'-tetramethylethylenediamine (TMEDA), tetrahydrofurane (THF) or ditetrahydrofurylpropane (DTHFP). A wide range of ethers and amines can also be utilized, for example: dimethyl ether, diethyl ether, di-n-propyl ether, diisopropyl ether, di-n-butyl ether, dioxane, ethylene glycol dimethyl ether, ethylene glycol diethyl ether, diethylene glycol di methyl ether, diethylene glycol diethyl ether, triethylene glycol dimethyl ether, trimethyl amine, triethyl amine, N-methyl morpholine, N-ethyl morpholine, N-phenyl morpholine, etc.

The terminal functionalization of these elastomers is introduced with the objective of improving the interaction of the polymeric chains with the reinforcements in the vulcanized compounds. It is usually introduced utilizing a functionalized terminator, or by the reaction between the active terminals of the polymeric chains and the compounds that present desirable functional groups.

A large variety of functionalizations can, in principle, be incorporated in these elastomers. It is preferable that these functionalizations are incorporated in at least one of the extremities of the polymeric chains, or in both.

For example, a functional group can be introduced via the utilization of a functionalized initiator, and the other by the utilization of a terminator, also functionalized, at the end of the polymeric chains. The groups can be identical or different.

It is preferable that the functional groups are directly linked to the small polymeric block with a differentiated structure, instead of being linked to the part of the polymeric chain that has a random distribution of mers (main chain), since in this position the interaction and/or reaction with the reinforcements is favorable.

It is also preferable that the small polymeric block with a differentiated structure remains in close proximity to this region of the interaction between the reinforcements and the functional groups, that is, preferentially at the end of the polymeric chains.

It is known that a large variety of compounds can be utilized for the functionalization of polymers, such as ethylene oxide, benzophenone, carbon dioxide, dialkylaminobenzaldehyde, carbon disulfide, alkoxysilanes, alkylphenoxysilanes, phenoxysilanes, etc.

The patents EP 396780 and EP 849333 provide examples of compounds and processes that can be employed with this objective. These patents are included in this document for reference.

The terminal functional groups of the polymeric chains of these elastomers, are preferentially of type —OH, —COOH, —COX, where X is a halogen, —SH, —CSSH, —NCO, amine, epoxy, silyl, silanol or siloxane, as well as the polysiloxane and siloxane groups or polysiloxane containing amine groups.

Some of these groups can be better represented by the following structures:

Amine groups: —N($R_1$)$_2$, —NR1R2-NHR$_1$, —NH$_2$, where $R_1$ and R2 are identical or different, can be alkyl groups, linear or branched, cycloalkyl, aryl, alkylaryl, aralkyl or vinyl, in each case having from 1 to 20 carbon atoms;

Silyl, silanol and siloxane groups: —SiH$_2$(OH), —Si($R_1$)$_2$(OH), —SiH(OH)$_2$, —SiR$_1$(OH)$_2$, —Si(OH)$_3$, —Si(OR$_1$)$_3$, —(SiR$_1$R$_2$O)$_x$—R$_3$, —Si(R$_3$)$_{3-m}$(X)$_m$, where X is a halogen, x is the number of repetitive units between 1 to 500, in is the number of replacement groups, and can vary from 0 to 3, $R_1$ and $R_2$ are identical or different, and can be alkoxy or alkyl groups, linear or branched, cycloalkyl, aryl, alkylaryl, aralkyl or vinyl, in each case having from 1 to 20 carbon atoms, and $R_3$ is H or alkyl, branched or linear, in each case having from 1 to 20 carbon atoms, or a mononuclear aryl group; and Siloxane groups that contain amine groups, represented by the formula -A$^1$-Si(A$^2$-N((H)$_k$(R$_1$)$_{2-k}$)$_y$(OR$_1$)$_z$(R$_3$)$_{3-(y+z)}$, where: k can vary from 0 to 2, y can vary from 1 to 3, z can vary from 0 to 2, 0≤y+z≤3, being that, $R_1$ and $R_2$ are identical or different, and can be alkyl groups, linear or branched, cycloalkyl, aryl, alkylaryl, aralkyl or vinyl, in each case having from 1 to 20 carbon atoms, aryl mononuclear groups, $R_3$ is H or alkyl, branched or linear, in each case having from 1 to 20 carbon atoms, or a mononuclear aryl group, and A$^1$ and A$^2$ are chains of up to 12 carbon atoms, linear or branched, preferentially alkyl, alyl or vinyl.

For the elastomers of this invention, preferential use is given to hexamethylcyclotrisiloxane (D$_3$), which allows the terminal incorporation of the continuous sequences of the functional group —[—Si(CH$_3$)$_2$—O—]—, with different lengths, and a silanol terminal group —Si(CH$_3$)$_2$—OH.

As previously stated, these elastomers are obtained by the process of anionic polymerization in solution. The utilization of this polymerization process requires that all the materials employed are void of any impurities that may in any way prejudice the end result of the polymerization, such as humidity, chain transfer agents, etc.

This invention uses a method of polymerization divided into sequential steps, which allows a large control over the polymeric architecture.

In the first step, the random copolymerization of main chain is performed, in an appropriate reactor, involving the selected monomers. Normally a monomer with an aromatic vinyl structure (e.g.: styrene) and a conjugated diene (e.g.: 1,3-butadiene) are employed in the appropriate proportions. The percentage ratio in weight between these monomers varies in the range from 5% to 50% for the aromatic vinyl monomer and from 50% to 95% for the conjugated diene. More specifically, it adopts a chemical content in the range from 15% to 40% in weight for the aromatic vinyl monomer, and in the range from 60% to 85% in weight for the conjugated diene, for these copolymers.

The copolymerization reaction is conducted in an appropriate apolar solvent, normally using cyclohexane or n-hexane.

The percentage ratio in weight monomers/solvent is controlled to ensure that the chemical content of the total solids at the end of the reaction are found in the range from 8% to 30%. More specifically, it is employed in the range of total solids employed is in the range of from 10% to 18%, and even more specifically, it is desirable that the chemical content of the solids of these reactions is between 12% to 16%.

For the initiation of these reactions, organometallic compounds of lithium are employed. N-butyl-lithium is preferred as the initiator, due to its appropriate reactivity with the copolymerization 1,3-butadiene-styrene and its larger commercial availability.

The quantity employed of this initiator is related to the total mass of the monomers employed in the reaction and the end molecular weight desired for the copolymer.

A polar additive is also used at this step of the copolymerization, which acts as a Lewis base, which is added to the rectional medium, before the start of the reaction. Its function is to increase the chemical content of the 1,2-vinylic units of the polymeric chains.

These copolymers present a chemical content of 1,2-vinylic units in the range from 8% to 80%, considering the total of the diene incorporated with the copolymer.

It is desirable that the chemical content of the 1,2-vinylic units be in the range from 10% to 70%. More specifically, a chemical content of 1,2-vinylic units between 55% and 65% is preferred.

This additive is not consumed during the copolymerization and the quantity utilized depends on an appropriate molar relation with the quantity of initiator employed. This relation is chosen to allow a better control of the kinetics of the reaction, as well as the microstructure of the diene incorporated with the copolymer.

The reaction of the copolymerization, strictly speaking, is achieved in the range of temperature between 35° C. and 120° C. More specifically, the copolymerization is achieved between 40° C. and 90° C. Even more specifically, the copolymerization is achieved between 50° C. and 80° C., which is maintained until the total conversion of the monomers, which normally occurs between 30 and 45 minutes. The control of the temperature during this step is fundamental for the obtainment of the desired chemical content of the 1,2-vinylic units, which vary depending on the temperature of the reaction.

The pressure of the reactor during this step varies normally in the range from 2 Kgf/cm$^2$ to 6 Kgf/cm$^2$.

Once the total conversion of the comonomers is achieved in the first step, in a second step a determinate quantity of monomer(s) are added that will compose the small end block of the main polymeric chains.

This addition is performed over the active anionic chains of the copolymer, in the range of temperature between 55° C. and 90° C. More specifically, it occurs in the range of temperature between 60° C. and 75° C., with the reactor pressure in the range from 2 Kgf/cm$^2$ to 6 Kgf/cm$^2$. The rectional medium is maintained in these conditions until the total conversion of the added monomer(s), which normally occurs between 10 and 20 minutes.

Once the total conversion of the monomer(s) is achieved, in a third step, the compound is added that will functionalize the copolymer with the still active anionic chains, which now incorporate a small end block with a structure differentiated from the main chain, in the range of temperature between 60° C. and 80° C., and the same range of pressure employed in the previous step.

Preferentially, hexamethylcyclotrisiloxane (D$_3$) is employed as the functionalizing agent. This cyclic compound allows, by the opening of its ring, the incorporation of the continuous sequences of the siloxane functional group (—[—Si(CH$_3$)$_2$—O—]—).

Once this step is concluded, which normally takes from 15 to 20 minutes, a terminator agent is added, maintaining the same previous reactionary conditions. Cetylic alcohol, or other alcohol with a high molecular weight, is employed as the terminator agent of the polymerization.

This final step is normally concluded in 10 minutes, with the deactivation of all the active anionic chains and the formation of the silanol terminal group —Si(CH$_3$)$_2$—OH in the polymeric chains.

The resulting elastomer, still in solution, is subsequently stabilized with the addition of an appropriate quantity of trynonylphenylphosphite and octadecyl 3,5-di-t-butyl-4-hydroxyhydrocinnamate antioxidants.

EXAMPLES

Illustrative examples of the invention now follow. However, these examples do not, in any manner or form, limit the scope of this claim.

Example 1 (B2)

Preparation of an elastomer of type S-SBR functionalized, whose main polymeric chains have a random distribution in their constituent mers and a controlled microstructure, containing an end block of polybutadiene, followed by a continuous sequence of the siloxane functional group (—[—Si(CH$_3$)$_2$—O—]—) and a silanol termination (—Si(CH$_3$)$_2$—OH).

A schematic representation of the structure of this elastomer is presented below:

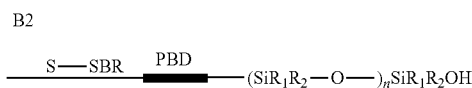

where, R$_1$ and R$_2$=CH$_3$; PBD=block of polybutadiene; n=n° of siloxane units In a 2 liter capacity reactor, equipped with a turbine type mechanical agitator and a refrigeration cover, the first step was performed of the anionic copolymerization of the 1,3-butadiene monomers and styrene, in a solution of cyclohexane, with the polar additive TMEDA, and using n-butyl-lithium as the initiator.

For this copolymerization, the reactor was filled with 182 g of 1,3-butadiene, 46 g of styrene, 1290 g of cyclohexane and 1.5 g of TMEDA, aiming for a chemical content of total solids at the end of the reaction of 15% in weight.

For the initiation, a quantity of 0.085 g of n-butyl-lithium was used, which was necessary to neutralize any impurities still present in the materials being utilized and to initiate the copolymerization, strictly speaking. The copolymerization was conducted semi-adiabatically, with the temperature between 60° C. and 70° C., until the total conversion of the monomers.

In a second step, 5.5 g of 1,3-butadiene was added to the reactor. This monomer reacts with the active anionic chains of the rectional medium, forming a small block of polybutadiene at the end of the chains. This step of the polymerization of the 1,3-butadiene was accomplished with the temperature between 60° C. and 75° C., until the total conversion of the monomer.

Subsequently, in a third step, 1.8 g of hexamethylcyclotrisiloxane (D$_3$) was added, which reacts with the active anionic terminals of the polymeric chains, forming a sequence of siloxane functional groups. This third step was conducted with the temperature between 60° C. and 70° C., for a period of 15 to 20 minutes.

Finally, in the last step, 0.4 g of cetylic alcohol was added, to deactivate all the active anionic terminals, forming the silanol terminal group in the polymeric chains. This step took 10 minutes and was conducted with the temperature between 60° C. and 70° C.

The elastomer obtained in this way, and still in solution, was subsequently stabilized with the addition of 0.9 g of the antioxidant trynonylphenylphosphite and 0.5 g of the antioxidant octadecyl 3,5-di-t-butyl-4-hydroxyhydrocinnamate.

The produced elastomer was recovered by the drying by evaporation of the solvent of the polymeric solution, in an open mill, heated to 100° C.

The Mooney viscosity (M11+4 @ 100° C.) of the produced elastomer was 58. The total chemical content of styrene in the copolymer was 19.6% and the chemical content of the 1,2-vinylic units, based on the incorporated 1,3-butadiene, was 63.7%. Both these results were obtained using RMN $^1$H spectroscopy.

The molecular weight and the polydispersion of the elastomer were determined by Size Exclusion Chromatography, based on the standards of polystyrene, providing the values Mw=430.000 g/mol; Mn=340,000 g/mol and pd=1,2 respectively.

With the values of the obtained molecular weights and the masses of the added materials and the number of moles of the determined active initiator, it was possible to determine that the polymeric chains of the obtained elastomer in average had a block of polybutadiene of approximately 150 mers, on average.

The confirmation of the functionalization of the elastomer was obtained via RMN $^1$H spectroscopy, analyzing a sample of the elastomer submitted to a process of purification, in which a cycle of dissolution in cyclohexane followed by coagulation in ethanol and drying, was repeated 3 times, to remove any residual of the functionalizing agent not incorporated in the polymeric chains. The analysis was performed with the sample dissolved in CDCl$_3$ (deuterated chloroform), without the use of TMS (tetramethylsilane) as a marker.

A spectrum of RMN $^1$H characteristic of elastomer functionalized with siloxane, presented typical signs or bands of the hydrogen element of the methyl groups linked to the silicon element, in the region between 0 and 0.1 ppm.

The results of the RMN $^1$H analyses, together with the results of the Size Exclusion Chromatography and the number of moles of the determined active initiator, allowed the obtainment of an average value for the length of the sequences of the siloxane functional group (—[—Si(CH$_3$)$_2$—O—]—), including the silanol terminal group (—Si(CH$_3$)$_2$—OH), which were incorporated in the polymeric chains, which in this case corresponded to 5 units.

In Table 3, the results of the characterization of this elastomer are presented.

TABLE 3

| Elastomer | S-SBR Example 01 |
|---|---|
| Mooney Viscosity (Ml1 + 4) at 100° C. | 58.0 |
| Total styrene content, in copolymer, % weight, RMN$^1$H | 19.6 |
| Content of 1,2-Vinylic Units, %$^{(a)}$ | 63.7 |
| Block with mers of butadiene at the end of the main chain | Average of 150 mers per polymeric chain |

TABLE 3-continued

| Elastomer | S-SBR Example 01 |
|---|---|
| Functionalization —[—Si(CH$_3$)$_2$—O—]$_n$—Si(CH$_3$)$_2$—OH | Average of 5 groups per polymeric chain, including the silanol terminal group |

$^{(a)}$= based on the content of the diene incorporated in the copolymer

Example 2 (C2)

Preparation of an elastomer of type S-SBR functionalized, whose main polymeric chains have random distribution in their constituent mers and a controlled microstructure, containing an end block of polystyrene, followed by a continuous sequence of the siloxane functional group (—[—Si(CH$_3$)$_2$—O—]—) and a silanol termination (—Si(CH$_3$)$_2$—OH).

A schematic representation of the structure of this elastomer is presented below:

C2

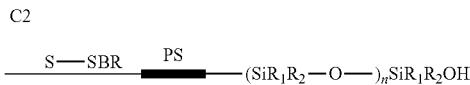

where, R$_1$ and R$_2$=CH$_3$; PS=block of polystyrene; n=n° of siloxane units

In a 2 liter capacity reactor, equipped with a turbine type mechanical agitator and a refrigeration cover, the first step was performed of the anionic copolymerization of the 1,3-butadiene monomers and styrene, in a solution of cyclohexane, with the polar additive TMEDA, and using n-butyl-lithium as the initiator.

For this copolymerization, the reactor was filled with 146 g of 1,3-butadiene, 37 g of styrene, 1343 g of cyclohexane and 1.1 g of TMEDA.

For the initiation, a quantity of 0.072 g of n-butyl-lithium was used, which was necessary to neutralize any impurities still present in the materials being utilized and to initiate the copolymerization, strictly speaking. The copolymerization was conducted semi-adiabatically, with the temperature between 50° C. and 70° C., until the total conversion of the monomers.

In a second step, 9.3 g of styrene was added to the reactor. This monomer reacts with the active anionic chains of the rectional medium, forming a small block of polystyrene at the end of the chains. This step of the polymerization of the styrene was accomplished with the temperature between 70° C. and 80° C., until the total conversion of the monomer.

Subsequently, in a third step, 0.3 g of hexamethylcyclotrisiloxane (D$_3$) was added, which reacts with the active anionic terminals of the polymeric chains, forming a sequence of siloxane functional groups. This third step was conducted with the temperature between 70° C. and 80° C., for a period of 15 to 20 minutes.

Finally, in the last step, 0.3 g of cetylic alcohol was added, to deactivate all the active anionic terminals, forming the silanol terminal group in the polymeric chains. This step took 10 minutes and was conducted with the temperature between 70° C. and 80° C.

The elastomer obtained in this way, and still in solution, was subsequently stabilized with the addition of 0.7 g of the antioxidant trynonylphenylphosphite and 0.4 g of the antioxidant octadecyl 3,5-di-t-butyl-4-hydroxyhydrocinnamate.

The produced elastomer was recovered by the drying by evaporation of the solvent of the polymeric solution, in an open mill, heated to 100° C.

The Mooney viscosity (Ml1+4 @ 100° C.) of the thus produced elastomer was 55. The total chemical content of styrene in the copolymer was 23.3% and the chemical content of the 1,2-vinylic units, based on the incorporated 1,3-butadiene, was 61.0%. Both these results were obtained using RMN $^1$H spectroscopy.

The molecular weight and the polydispersion of the elastomer were determined by Size Exclusion Chromatography, based on the standards of polystyrene, providing the values Mw=358.000 g/mol; Mn=260.000 g/mol and pd=1,3 respectively.

To obtain the characterization results of this elastomer, the same procedures and analytical methods used in example 1 were adopted.

In Table 4, the results of the characterization of this elastomer are presented.

TABLE 4

| Elastomer | S-SBR Example 02 |
|---|---|
| Mooney Viscosity (Ml1 + 4) at 100° C. | 55 |
| Total styrene content, in copolymer, % of weight, RMN$^1$H | 23.3 |
| Content of 1,2-Vinylic Units, %$^{(a)}$ | 61.0 |
| Block with mers of styrene at the end of the main chain | Average of 130 mers per polymeric chain |
| Functionalization —[—Si(CH$_3$)$_2$—O—]$_n$—Si(CH$_3$)$_2$—OH | Average of 3 groups per polymeric chain, including the silanol terminal group |

$^{(a)}$= based on the content of the diene incorporated in the copolymer

Preparation of the Vulcanized Compounds and their Properties.

For a better evaluation of the properties of these elastomers, it is necessary to test them in the vulcanized compounds employed in the production of tires.

The preparation of these compounds follows conventional methods. The different components are mixed in distinct steps, in the appropriate equipment, followed by the final step of vulcanization, where the crossed links connections occur that provide the final form.

Contained in the recipe of the preparation of these compounds, as well as the elastomers to be tested, are other elastomers such as natural rubber (NR) and polybutadiene (BR). There are also other important components, such as the fillers, among them silica, oils, accelerators, antiozonants, antioxidants, stearic acid, plasticizers, etc, as well as the vulcanization system, consisting basically of sulfur or compounds that produce sulfur during the vulcanization step.

To compare the results, a vulcanized compound was prepared, using a reference elastomer.

The materials used in the preparation of the vulcanized compounds containing the elastomers of this invention and the reference compound, are presented in Tables 6 and 9.

The vulcanized compounds were prepared in the following manner:

In the first step, all the components were mixed in a laboratory tangential mixer, except those pertaining to the system of vulcanization. Once the pre-mixture was obtained, the vulcanization system components were added. The final mixture, containing all the required components, was then processed in an extruder and converted into the pre-form of a tread, used for the production of tires.

After the vulcanization in high pressures and temperatures, trial samples were prepared to be subsequently tested to determine the typical properties of the vulcanized compounds. The results are used as the final performance indicators of these materials.

The following test methods were employed to evaluate the properties of the compounds:

Hardness Shore A, in an ambient temperature and at 70° C. norm. DIN 53 505;

Rebound resilience, at an ambient temperature and at 70° C., norm DIN 53 512;

Tensile strength, at an ambient temperature, norm DIN 53 504;

Elongation at break, at an ambient temperature, norm DIN 53 504;

Stress modulus at 100% and at 300% of elongation, at an ambient temperature, norm DIN 53 504;

Tan delta at 0° C. measured using a dynamic deformation with an amplitude of 0.2%, with 10% pre-deformation, at a frequency of 10 Hz;

Storage modulus average E°, with the temperature from −25° C. to −5° C., norm DIN 53 513, using a deformation with an amplitude of 0.2%, with 10% pre-deformation, at a frequency of 10 Hz;

Example 3

Vulcanized elastomeric compounds prepared with the group 1 elastomers.

The group 1 elastomers are type S-SBR. Their main polymeric chains have a random distribution in their constituent mers and a controlled microstructure, containing an end block of polybutadiene, followed by a continuous sequence of the siloxane functional group (—[—Si(CH$_3$)$_2$—O—]—) and a silanol termination (—Si(CH$_3$)$_2$—OH).

In Table 5, the main characteristics of these elastomers are presented.

TABLE 5

| Elastomer | S-SBR composition | Block of polybutadiene | Terminal Functionalization |
|---|---|---|---|
| A$_2$ (reference) | 21.0% styrene; 63.0% 1,2-vinyl$^{(a)}$ | not present | siloxane groups and terminal silanol |
| B$_1$ | 19.0% styrene; 64.1% 1,2-vinyl$^{(a)}$ | Block with an average of 50 mers of butadiene per chain | siloxane with an average of 8.0 groups per chain including silanol terminal group |
| B$_2$ | 19.6% styrene; 63.7% 1,2-vinyl$^{(a)}$ | Block with an average of 150 mers of butadiene per chain | siloxane with an average of 5.0 groups per chain including silanol terminal group |

$^{(a)}$= based on the content of the diene incorporated in the copolymer where, A$_2$ is the elastomer used as the reference in the comparative tests, which has a composition similar to the elastomers B$_1$ and B$_2$. However, it does not have a block of polybutadiene at the end of the polymeric chains, and is functionalized with the terminal siloxane and silanol groups, as described in patent EP 110998.

The elastomers B$_1$ and B$_2$ were prepared as described in example 1, with adjustments made to the quantities of the employed materials, as required.

The recipe used for the preparation of the vulcanized compounds, using the elastomers A$_2$, B$_1$ and B$_2$, is presented in Table 6.

The relative quantities of the components are expressed as a percentage of rubber, or pcb.

TABLE 6

| Components, pcb | Vulcanized compounds | | | | | |
|---|---|---|---|---|---|---|
| | $A_2$ | $B_1$ | $B_2$ | $A_2$-BR | $B_1$-BR | $B_2$-BR |
| $A_2$ (reference) | 100 | — | — | 50 | — | — |
| $B_2$ | — | — | 100 | — | — | 50 |
| $B_1$ | — | 100 | — | — | 50 | — |
| BR | — | — | — | 50 | 50 | 50 |
| Silica | 95 | 95 | 95 | 95 | 95 | 95 |
| Oil | 35 | 35 | 35 | 45 | 45 | 45 |
| 6PPD | 2 | 2 | 2 | 2 | 2 | 2 |
| TMQ | 2 | 2 | 2 | 2 | 2 | 2 |
| Antiozonant (wax) | 2 | 2 | 2 | 2 | 2 | 2 |
| ZnO | 2.5 | 2.5 | 2.5 | 2.5 | 2.5 | 2.5 |
| Stearic acid | 2.5 | 2.5 | 2.5 | 2.5 | 2.5 | 2.5 |
| Silanol | 8.075 | 8.075 | 8.075 | 6.650 | 6.650 | 6.650 |
| DPG | 2 | 2 | 2 | 2 | 2 | 2 |
| CBS | 2 | 2 | 2 | 1.6 | 1.6 | 1.6 |
| Sulfur | 2 | 2 | 2 | 2 | 2 | 2 |

Where:
BR = polybutadiene rubber;
6PPD = N-(1,3-dimethylbutyl)-N'-phenyl-p-phenylenediamine;
TMQ = 2,2,4-trimethyl-1,2-dihydroquinoline
DPG = N,N-diphenylguanidine
CBS = benzotriazol-2-cyclohexylsulfenamide;
Oil = type TDAE (Treated and Distilled Aromatic Extract);
Silica = VN3, Degussa AG, Germany, surface area: 175 m$^2$/g, CTAB 160 m$^2$/g;
Silanol (functionalization reagent) = SILQUEST A 1589, General Electric, USA.

In Table 7, the results obtained in the abovementioned tests for the different prepared compounds, are presented.

TABLE 7

| Measured property | Vulcanized compounds | | | | | |
|---|---|---|---|---|---|---|
| | $A_2$ | $B_1$ | $B_2$ | $A_2$-BR | $B_1$-BR | $B_2$-BR |
| Hardness Shore A at an ambient temperature | 68.3 | 69.8 | 70.7 | 62.8 | 63.6 | 63.1 |
| Hardness Shore A, 70° C. | 65.0 | 66.6 | 67.6 | 59.0 | 59.9 | 59.3 |
| Rebound resilience, % at an ambient temperature | 15.0 | 14.9 | 14.5 | 32.2 | 32.4 | 32.7 |
| Rebound resilience, % at 70° C. | 50.4 | 48.9 | 48.9 | 46.9 | 44.9 | 45.5 |
| Tensile Strength, Mpa at an ambient temperature | 14.8 | 14.7 | 13.1 | 14.8 | 14.1 | 14.3 |
| Elongation at break, % at an ambient temperature | 325 | 340 | 309 | 578 | 577 | 576 |
| Stress, Mpa at 100% deformation | 3.18 | 3.26 | 3.26 | 1.66 | 1.79 | 1.78 |
| Stress, Mpa at 300% of deformation | 14.97 | 13.96 | 14.46 | 6.30 | 6.22 | 6.29 |
| E', Mpa with the temperature between (−25° C. to −5° C.) | 630 | 451 | 449 | 35 | 32 | 33 |

The measurement of the storage modulus E, with the temperature between −25° C. to −5° C., can be considered as a performance indicator for icy skid resistance. A reduction in the values of E' indicates an improvement in this property.

In Table 7, it can be observed that both the vulcanized compounds $B_1$ and B2, compared to the reference compound $A_2$, and the vulcanized compounds $B_1$-BR and $B_2$-BR, compared to the reference compound $A_2$-BR, present lower values for the storage modulus E', indicating a significant improvement in icy skid resistance.

The rebound resilience at the ambient temperature can be used as an indicator for wet skid resistance, where lower values indicate an improvement in this property.

The comparison of the results obtained for this property, between the aforementioned compounds and their respective references, indicates that they remain practically unaltered, and that the performance of these compounds, in relation to wet skid resistance, was maintained.

The elastomers of this invention, which have main polymeric chains with a random distribution in their constituent mers and a controlled microstructure, containing an end block of polybutadiene, followed by a continuous sequence of the siloxane functional group (—[—Si(CH$_3$)$_2$—O—]—) and a silanol termination (—Si(CH$_3$)$_2$—OH), make possible the obtainment of elastomeric vulcanized compounds, which have the advantage of presenting a significant improvement in the icy skid resistance, without prejudicing the wet skid resistance. Both these properties are desirable in high performance tires.

Example 4

Vulcanized elastomeric compounds prepared with the group 2 elastomers.

The group 2 elastomers are type S-SBR. Their main polymeric chains have a random distribution in their constituent mers and a controlled microstructure, containing an end block of polystyrene, followed by a continuous sequence of the siloxane functional group (—[—Si(CH$_3$)$_2$—O—]—) and a silanol termination (—Si(CH$_3$)$_2$—OH).

In Table 8, the characteristics of these elastomers are presented.

TABLE 8

| Elastomer | SSBR composition | Block of polystyrene | Terminal functionalization |
|---|---|---|---|
| $A_1$ (reference) | 21.0% styrene; 63.0% 1,2-vinyl[a] | not present | Amine terminal groups |
| $C_1$ | 21.4% styrene; 62.8% 1,2-vinyl[a] | Block with an average of 54 mers of styrene per chain | siloxane with an average of 3.0 groups per chain including silanol terminal group |
| $C_2$ | 23.3% styrene; 61.0% 1,2-vinyl[a] | Block with an average of 130 mers of styrene per chain | siloxane with an average of 3.0 groups per chain including silanol terminal group |

[a] = based on the content of the diene incorporated in the copolymer where, $A_1$ is the elastomer used as the reference in the comparative tests, which has a composition similar to the elastomers $C_1$ and $C_2$. However, it does not have a block of polystyrene at the end of the polymeric chains, and is functionalized terminally with the amine groups.

The elastomers $C_1$ and $C_2$ were prepared as described in example 2, with adjustments made to the quantities of the employed materials, as required.

The recipe used for the preparation of the vulcanized compounds, using the elastomers $A_1$, $C_1$ and $C_2$, is presented in Table 9.

The relative quantities of the components of the recipe are expressed as a percentage of rubber, or pcb.

TABLE 9

| Components, pcb | Vulcanized compounds | | | | | | |
|---|---|---|---|---|---|---|---|
| | $A_1$ | $C_1$ | $C_2$ | $C_1$-NR | $C_2$-NR | $C_1$-BR | $C_2$-BR |
| NR | — | — | — | 50 | 50 | — | — |
| BR | — | — | — | — | — | 50 | 50 |
| $A_1$ (ref.) | 100 | — | — | — | — | — | — |
| $C_1$ | — | 100 | — | 50 | — | 50 | — |
| $C_2$ | — | — | 100 | — | 50 | — | 50 |
| Silica | 95 | 95 | 95 | 95 | 95 | 95 | 95 |
| Oil | 35 | 35 | 35 | 35 | 35 | 35 | 35 |
| 6PPD | 2 | 2 | 2 | 2 | 2 | 2 | 2 |
| TMQ | 2 | 2 | 2 | 2 | 2 | 2 | 2 |
| Antiozonant (Wax) | 2 | 2 | 2 | 2 | 2 | 2 | 2 |
| ZnO | 2 | 2 | 2 | 2 | 2 | 2 | 2 |
| Stearic Acid | 2 | 2 | 2 | 3 | 3 | 3 | 3 |
| Silanol | 9 | 8 | 8 | 8 | 8 | 8 | 8 |
| DPG | 2 | 2 | 2 | 2 | 2 | 2 | 2 |
| CBS | 2 | 2 | 2 | 2 | 2 | 2 | 2 |
| Sulfur | 2 | 2 | 2 | 2 | 2 | 2 | 2 |

Where:
NR = natural rubber;
BR = polybutadiene rubber;
6PPD = N-(1,3-dimethylbutyl)-N'-phenyl-p-phenylenediamine;
TMQ = 2,2,4-trimethyl-1,2-dihydroquinoline;
DPG = N,N-diphenylguanidine;
CBS = benzotriazol-2-cyclohexylsulfenamide;
Oil = type TDAE (Treated and Distilled Aromatic Extract);
Silanol = functionalization reagent SILQUEST A-1589, General Electric, USA.
Silica = VN3, Degussa AG, Germany, surface area: 175 m$^2$/g, CTAB 160 m$^2$/g;

In Table 10, the results obtained in the abovementioned tests for the different prepared compounds, are presented.

TABLE 10

| Measured property | Vulcanized compounds | | | | | | |
|---|---|---|---|---|---|---|---|
| | $A_1$ | $C_1$ | $C_2$ | $C_1$-NR | $C_2$-NR | $C_1$-BR | $C_2$-BR |
| Hardness Shore A at an ambient temperature | 75.3 | 73.5 | 76.5 | 72.8 | 72.5 | 72.1 | 71.8 |
| Hardness Shore A, 70° C. | 70.4 | 70.5 | 70.0 | 69.2 | 67.9 | 69.3 | 68.1 |
| Rebound resilience, % at an ambient temperature | 15.6 | 14.9 | 13.3 | 22.0 | 19.3 | 32.2 | 28.6 |
| tan delta at 0° C. | 0.540 | 0.554 | 0.576 | 0.365 | 0.384 | 0.276 | 0.289 |
| Stress, Mpa at 100% deformation | 3.60 | 3.50 | 3.62 | 2.49 | 2.37 | 2.61 | 2.47 |
| Rebound resilience, % at 70° C. | 42.5 | 44.4 | 37.0 | 44.9 | 40.9 | 47.7 | 43.9 |

The measurement of rebound resilience to the ambient temperature and the tan delta at 0° C., are conventional indicators of wet skid resistance. There is always an improvement in the performance of this property when the values for the rebound resilience to ambient temperature reduce and the values for the tan delta at 0° C. increase.

The results presented in Table 10 indicate an improvement in this property, for the vulcanized compounds $C_1$ and $C_2$, when compared with the reference compound $A_1$, since both $C_1$ and $C_2$ have reduced rebound resiliencies to the ambient temperature, and an increase in the values of the tan delta at 0° C.

The combination of the measurements of rebound resilience at 70° C. and of stress at 100% deformation is used for an evaluation of the handling performance of a tire. The decrease in the values of the rebound resilience at 70° C. indicates an improvement in the handling performance of the tire, as does an increase in the values of stress at 100% deformation.

From a comparison between the results of the vulcanized compounds $C_1$ and $C_2$ in relation to the reference compound $A_1$, it can be seen that the values of the rebound resilience at 70° C., and the stress at 100% deformation, only present discrete variations, indicating that the handling performance remains unaltered.

The elastomers of this invention, which have main polymeric chains with a random distribution in their constituent mers and a controlled microstructure, containing an end block of polystyrene, followed by a continuous sequence of the siloxane functional group (—[—Si(CH$_3$)$_2$—O—]—) and a silanol termination (—Si(CH$_3$)$_2$—OH), make possible the obtainment of elastomeric vulcanized compounds, which have the advantage of combining properties such as a good performance in wet skid resistance, without affecting the handling performance. These are desirable properties in high performance tires.

This invention was described in terms of its preferred embodiment and the examples were provided in a purely illustrative manner and should not limit the scope of this document. In the same way, certain modifications and/or alterations may become apparent to a person skilled in the art, arising from this specification. However, any such modifications and/or alterations are deemed to be included in the scope of this present invention.

What is claimed is:

1. A process for preparing copolymer of 1,3-butadiene and styrene containing in its main chain a random segment, followed by a block having a different structure to the main chain, homopolymeric or copolymeric, functionalized and characterized by comprising the steps of:
    a first step of random copolymerization corresponding to an aromatic vinyl structure monomer and a conjugated diene with percentage relationship ranging between monomers of 5% to 50% w/w, for the aromatic vinyl monomer, and ranging from 50% to 95% w/w for the conjugated diene;

a second step of adding a determined quantity of the monomer(s) in a temperature range of between 55° C. and 90° C., with the reactor pressure ranging from 2 Kgf/cm² to 6 Kgf/cm²;

a third step of adding functionalization compound of the copolymer in a temperature range of between 60° C. and 80° C., in the same pressure range as used in the prior step; and a stabilization step comprising the addition of antioxidants trinonylphenylphosphite and octadecyl 3,5-di-t-butyl-4-hydroxyhydrocinnamate.

2. The process of claim 1, characterized by the fact that in the copolymerization step the percentage relationship between these monomers varies from 15% to 40% w/w for the aromatic vinyl monomer and from 60% to 85% w/w for the conjugated diene.

3. The process of claim 1, characterized by the fact that the solvent employed in the copolymerization step belongs to the class of aliphatics.

4. The process of claim 1, characterized by the fact that in the copolymerization step the percentage relationship w/w monomers/solvent corresponds to a content of solids between 8% and 30% w/w.

5. The process of claim 4, characterized by the fact that the content of solids is comprised between 10% and 18% w/w.

6. The process of claims 4 or 5, characterized by the fact that the content of solids is comprised between 12% and 16% w/w.

7. The process of claim 1, characterized by the fact that the copolymerization step employs an organometallic initiator of lithium which comprises at least one of methyl, ethyl, n-propyl, isopropyl, n-butyl, sec-butyl, t-butyl, n-amyl, sec-amyl, n-hexyl, sec-hexyl, n-heptyl, n-octyl, n-nonyl, n-dodecyl, octadecyl and isobutyl-lithium.

8. The process of claim 1, characterized by the fact that in the copolymerization step the content of 1,2-vinylic units varies between 8% and 80% in relation to the conjugated dime incorporated in the polymer.

9. The process of claim 8, characterized by the fact that the content of 1,2-vinylic units varies between 10% and 70%, in relation to the conjugated diene incorporated in the polymer.

10. The process of claim 8, characterized by the fact that the content of 1,2-vinylic units varies between 55% and 65%, in relation to the conjugated diene incorporated in the polymer.

11. The process of claim 1, characterized by the fact that the copolymerization step occurs at a temperature between 35° C. and 120° C.

12. The process of claim 11, characterized by the fact that the copolymerization step occurs at a temperature between 40° C. and 90° C.

13. The process of claim 11, characterized by the fact that the copolymerization step occurs at a temperature between 50° C. and 80° C.

14. The process of claim 1, characterized by the fact that the monomer(s) addition step that will comprise the block having a different structure to the main chain occurs at a temperature between 55° C. and 90° C.

15. The process of claim 14, characterized by the fact that the monomer(s) addition step that will comprise the block having a different structure to the main chain occurs at a temperature between 60° C. and 75° C.

16. The process of claim 1, characterized by the fact that the reaction time of the block formation step having a different structure from the main chain varies between 10 and 20 minutes.

17. The process of claim 1, characterized by the tact that the elastomer functionalization step occurs at a temperature between 60° C. and 80° C.

18. The process of claim 1, characterized by the fact that the elastomer functionalization step occurs in a reaction time varying between 15 and 20 minutes.

19. The process of claim 1, characterized by the fact that the functionalization step employs hexamethylcyclotrissiloxane ($D_3$) and a terminator agent cetylic alcohol.

20. The process of claim 1, characterized by the fact that in the functionalization step, the termination reaction occurs at a time of around 10 minutes.

21. A copolymer product of 1,3-butadiene and styrene containing in its main chain a random segment, followed by a block having a different structure to the functionalized main chain, homopolymeric or copolymeric, comprising the following structure:

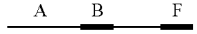

wherein:
A represents the main chains of a polymer, formed by the copolymerization between one or more conjugated dienes with one or more monomers having aromatic vinyl structure, which may have a random distribution of their constituent mars, linear or branched structure, and a controlled content of 1,2-vinylic units, based on the conjugated diene incorporated;

B represents a block having a different structure from the main chain, homopolymeric or copoiymeric, obtained by, copolymerization of two or more monomers with aromatic vinyl structure, or, copolymerization of one or more conjugated dienes with one or more monomers having aromatic vinyl structure, including the different possible microstructures for the diene(s) employed, provided that the final structure of this block is different from the main chain; and F is a terminal functional group of polymeric chains of the —OH, —COOH, or COX wherein X is a halogen, —SH, —CSSH, —NCO, amine, epoxy, silyl, silanol, siloxane, polysiloxane, polysiloxane groups containing amine groups, or groups of the type:
—$N(R_1)_2$, $NR1R2$, —$NHR_1$, —$NH_2$, wherein:
$R_1$ and R2 are identical or different, may be alkyl, linear or branched, cycloalkyl, aryl, alkylaryl, aralkyl or vinyl groups, in each case having from 1 to 20 carbon atoms, —$SiH_2(OH)$, —$Si(R_1)_2(OH)$, —$SiH(OH)_2$, —$SiR_1(OH)_2$, —$Si(OH)_3$, —$Si(OR_1)_3$, —$(SiR_1R_2O)_x$—$R_3$, —$Si(R_3)_{3-m}(X)_m$, wherein:

X is a halogen, x is the number of repetitive units between 1 and 500, m is the number of linked groups, varying from 0 to 3, $R_1$ and $R_2$ are identical or different, and may be alkoxy or alkyl, linear or branched, cycloalkyl, aryl, alkylaryl, aralkyl or vinyl groups, in each case having from 1 to 20 carbon atoms, and $R_3$ is H or alkyl, branched or linear, in each case having from 1 to 20 carbon atoms, or a mononuclear aryl group, or siloxane groups that contain amine groups, represented by the formula -$A^1$—$Si(A^2$—$N((H)_k(R_1)_{2-k}))_y(OR_1)_z(R_3)_{3-(y+z)}$, wherein:
k may vary from 0 to 2, y may vary from 1 to 3, and z may vary from 0 to 2 and 0≤y+z≤3, wherein, $R_1$ and $R_2$ are identical or different, and may be alkyl, linear or branched, cycloalkyl, aryl, alkylaryl, aralkyl or vinyl groups, in each case having from 1 to 20 carbon atoms, mononuclear aryl groups, $R_3$ is H or alkyl, branched or linear, in each case having from 1 to 20 carbon atoms, or a mononuclear aryl group, and $A^1$ and $A^2$ are chains of up to 12 carbon atoms, branched or linear; and wherein the elastomer presents a w/w percentage composition in its main chain that may respectively vary from 5% to 50% for the aromatic vinyl monomer and from 50 to 95% for the conjugated diene.

22. The copolymer product of 1,3-butadiene and styrene of claim 21, characterized by the tact that it comprises the following structure:

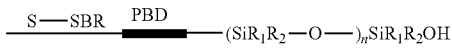

wherein S-SBR represents a copolymer chain of 1,3-butadiene-styrene; $R_1$ and $R_2$=$CH_3$; PBD=block of polybutadiene in which the number of mers varies from 5 to 250 units; n=number of siloxane units, varying between 1 and 500.

23. The copolymer product of 1,3-butadiene and styrene of claim 21, characterized by the fact that it comprises the following structure:

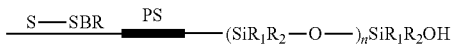

wherein, S-SBR represents a copolymer chain of 1,3-butadiene-styrene; $R_1$ and $R_2$=$CH_3$; PS=block of polystyrene in which the number of mers varies from 5 to 250 units; and n=number of siloxane units, varying from 1 to 500.

24. The copolymer product of 1,3-butadiene and styrene of claim 21, characterized by the fact that it comprises one or more conjugated dienes with one or more monomers having aromatic vinyl structure in which the conjugated diems are selected from 1,3-butadiene, 2-alkyl-1,3-butadiene, 2,3-dialkyl-1,3-butadiene, 2-alkyl-3-alkyl-1,3-butadiene, 1,3-pentadiene, 1,3-hexadiene, 2,4-hexadiene and the aromatic vinyl monomers are selected from styrene, alpha-methyl-styrene, ortho, meta and para divinylbenzene, ortho, meta and para-methylstyrene, para-t-butyl-styrene, vinyl-toluene, metoxystyrene, and vinylmesitylene.

25. The copolymer product of 1,3-butadiene and styrene of claim 21, characterized by the fact that it comprises a content of 1,2-vinylic units between 8% and 80%, based on the total of conjugated diene incorporated in the copolymer.

26. The copolymer product of 1,3-butadiene and styrene of claim 25, characterized by the fact that it comprises small polymeric blocks having a differentiated structure, located at the end of the polymeric chains whose length varies between 5 and 250 mers.

27. The copolymer product of 1,3-butadiene and styrene of claim 26, characterized by comprising a length of polymeric blocks between 20 and 180 mers.

28. The copolymer product of 1,3-butadiene and styrene of claim 21, characterized by the fact that terminal functional groups of the polymeric chains are selected from —[—Si($R_1R_2$)—O—]$_n$—Si($R_1R_2$)—OH, wherein $R_1$ and $R_2$ are identical or different, and may be alkoxy or alkyl, linear or branched, cycloalkyl, aryl, alkylaryl, aralkyl or vinyl groups, in each case having from 1 to 20 carbon atoms, and n represents the number of units of a functional siloxane group before a terminal silanol group.

29. The copolymer product of 1,3-butadiene and styrene of claim 21, characterized by the fact that the elastomer respectively presents a composition ranging from 15% to 40%, in relation to the w/w percentage of the monomer with aromatic vinyl structure and from 60% to 85% in relation to the w/w percentage of the conjugated diene incorporated in the copolymer.

30. The copolymer product of 1,3-butadiene and styrene of claim 21, characterized by the fact that the elastomer has a Mooney viscosity ranging from 30 to 90, and an average molecular weight ranging from 80,000 to 700,000, with a polydispersion ranging from 1.05 to 4.0.

31. The copolymer product of 1,3-butadiene and styrene of claim 21, characterized by the fact that the elastomer presents glass transition temperatures, Tg, ranging from −92° C. to −1° C.

* * * * *